Aug. 13, 1940.  H. FORD  2,211,413
TRACTOR POWER UNIT
Filed March 9, 1938  3 Sheets-Sheet 1

WITNESS
E. Witpee

INVENTOR
Henry Ford
Edwin C. McRae
E. L. Davis
BY  ATTORNEYS

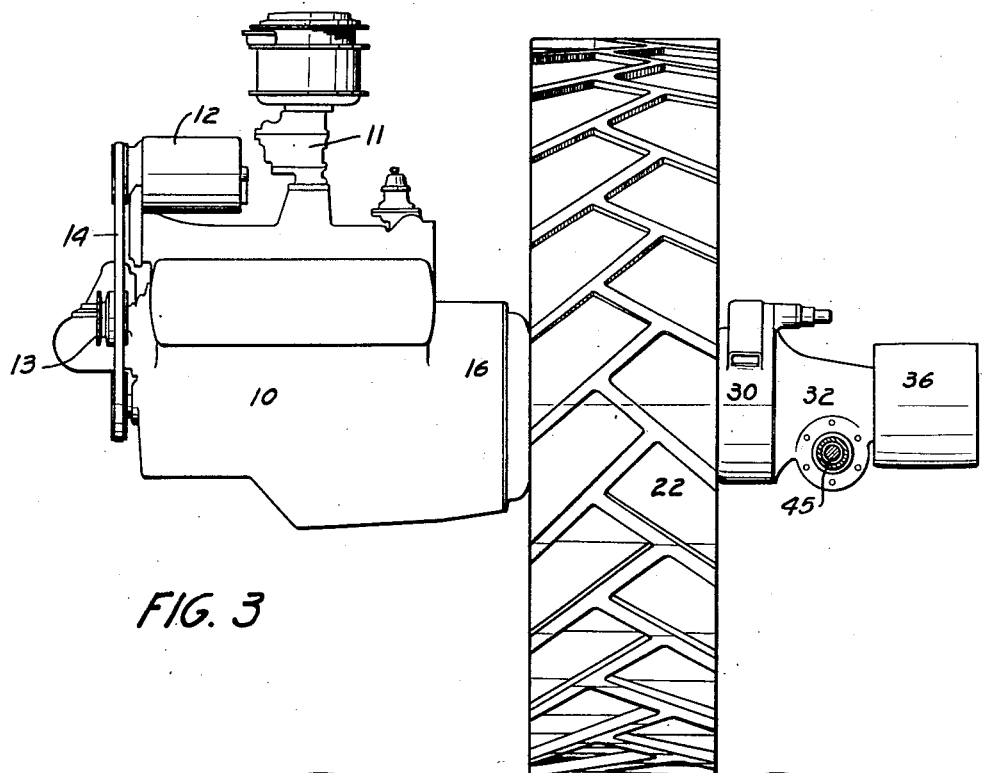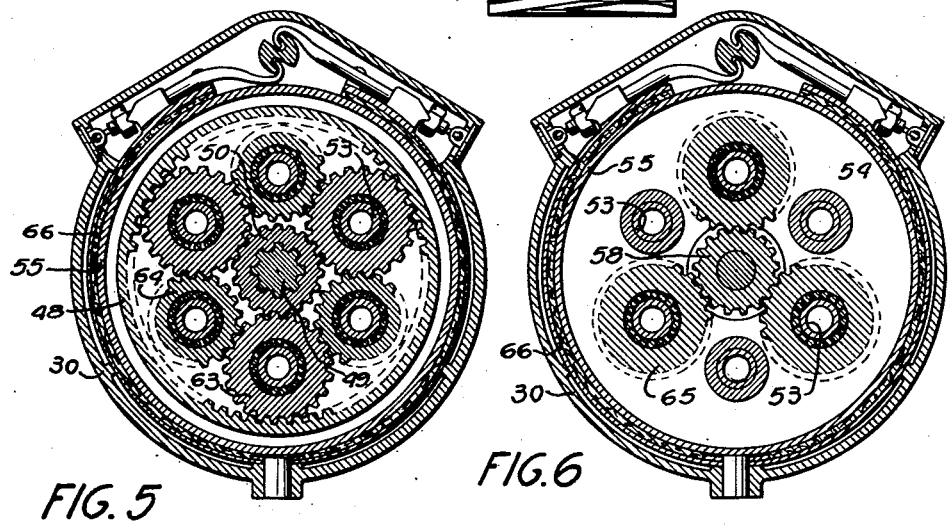

Aug. 13, 1940.     H. FORD     2,211,413
TRACTOR POWER UNIT
Filed March 9, 1938     3 Sheets-Sheet 3

WITNESS
E. Witzke

INVENTOR
Henry Ford
Edwin C. McRae
C. L. Davis
BY     ATTORNEYS

Patented Aug. 13, 1940

2,211,413

UNITED STATES PATENT OFFICE 2,211,413

TRACTOR POWER UNIT

Henry Ford, Dearborn, Mich., assignor to Ford Motor Company, Dearborn, Mich., a corporation of Delaware Application March 9, 1938, Serial No. 194,931

6 Claims. (Cl. 74—287.5)

The object of my invention is to provide a power unit especially adapted for use in driving a tractor, which unit consists of an internal-combustion engine, transmission, reduction gearing and driving wheel. This unit may be secured in a number of positions in a suitable frame to act as the source of power for driving the tractor.

A further object of my invention is to provide a power unit, as above described, in which the engine, transmission, reduction gearing and driving wheel are all axially aligned so that they may be connected through planetary gearing. It is well known that planetary gearing is much more efficient than either worm gearing or bevel gearing and that the weight of a planetary gear set for a given capacity is much less than that of the other two mentioned types of drives. My improved unit, having only planetary gearing therein, is thus exceptionally efficient in operation.

Still a further object of my invention is to provide a tractor having a pulley driven thereby, which pulley is connected directly to the motor without the driving power being transmitted through gearing, thereby increasing the efficiency of the tractor unit.

Still a further object of my invention is to provide a tractor unit in which the entire weight of the motor, transmission, and reduction gearing is supported only by the driving wheel and thereby increase the traction possible with such wheel.

With these and other objects in view, my invention consists in the arrangement, construction, and combination of the various parts of my improved device, as described in the specification, claimed in my claims, and illustrated in the accompanying drawings, in which:

Figure 3 is an end elevation of my improved drive unit.

Figure 5 is a sectional view, taken upon the line 5—5 of Figure 4.

Figure 6 is a sectional view, taken upon the line 6—6 of Figure 4, and

Figure 7:
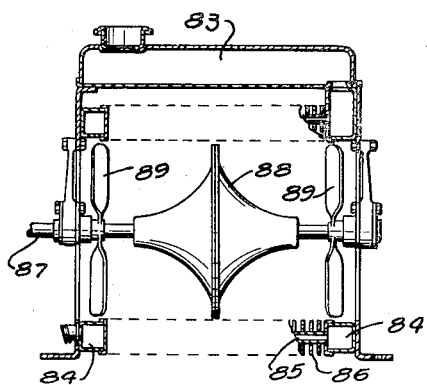
Figure 7 is a sectional view, taken upon the line 7—7 of Figure 2.

Referring to the accompanying drawings, I have used the reference numeral 10 to indicate a V-type 8-cylinder internal-combustion engine, said engine having a carburetor 11, generator 12 and water pumps 13 associated therewith. A belt 14 extends around pulleys on the generator and water pump and a pulley on the engine crankshaft so as to drive these accessories in the conventional manner.

Figure 4:
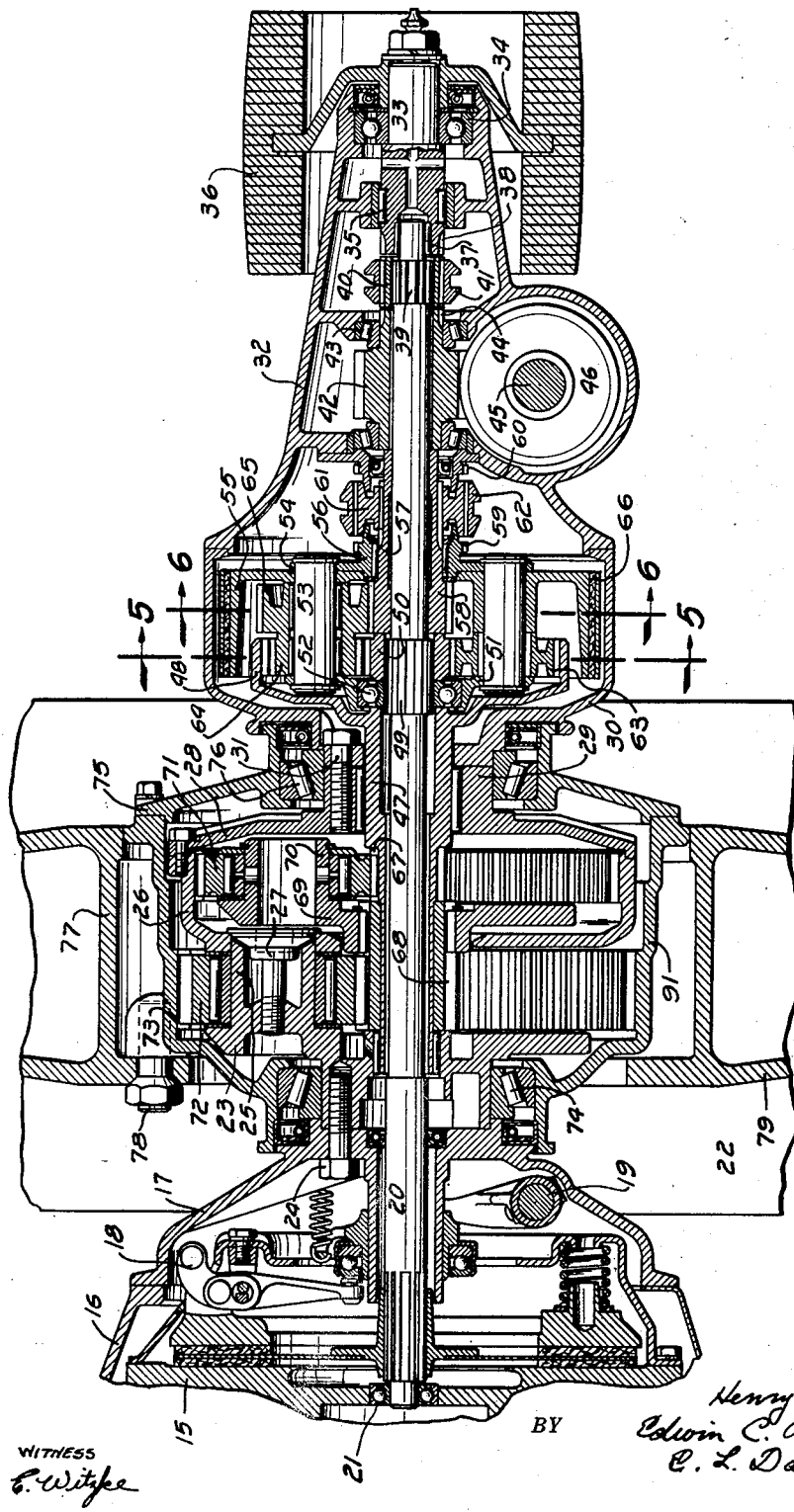
Figure 4 is a sectional view, taken upon the line 4—4 of Figure 2.

The engine is provided with a flywheel 15, shown in Figure 4, around which is provided a housing 16, this housing being cast integrally with the cylinder block of the engine 10. A clutch housing 17 is bolted to the periphery of the flywheel housing 16 and is designed to enclose a conventional single plate dry disc clutch 18, which clutch is operated by a throw-out shaft 19. The clutch will not be described in detail as it forms no part of my invention.

The driving disc of the clutch 18 is splined to one end of a shaft 20 which is piloted in a suitable bearing 21 in the flywheel 15. The shaft 20 transmits the torque from the engine to the transmission which is located at the intermediate portion of the shaft. The torque is then transmitted back through a reduction gear to a drive wheel 22, which will later be more fully described. The shaft 20 also transmits power to a power take-off pulley and, through suitable gearing, to a power take-off shaft.

Referring to the reduction gearing shown in Figure 4, it will be noted that a stationary spider member 23 is securely fastened to the clutch housing 17 by bolts 24. The spider member 23 has three relatively large pins 25 formed integrally therewith, the outer ends of which pins are fastened in suitable openings in an internal gear ring 26 by bolts 27. A disc 28 is secured to the outer edge of the ring 26, the center portion of this disc having a hub 29 formed integrally therewith to which hub a cylindrical transmission housing 30 is secured by means of a plurality of bolts 31. A conical shaped power take-off housing 32 is secured to the periphery of the transmission housing 30.

From the foregoing it will be noted that the clutch housing 17, spider 23, ring gear 26, disc 28, transmission housing 30 and power take-off housing 32 are all fixedly secured together and form the frame for my improved driving unit.

A pulley shaft 33 is rotatably mounted upon bearings 34 and 35 at the outer end of the housing 32 and a pulley 36 is fixedly secured to the outer end of this shaft. The inner end of shaft 33 rotatably supports the outer end of the drive shaft 20 upon a bearing 37, and this end of the shaft 33 is provided with clutch teeth 38.

That portion of the shaft 20 adjacent to the teeth 38 is splined, as at 39, to receive a clutch sleeve 40 upon which a clutch collar 41 is slidably splined. A spiral gear 42 is rotatably mounted upon a pair of spaced bearings 43 in the intermediate portion of the housing 32 and is provided with an axial opening therethrough through which the shaft 20 extends. The outer end of the gear 42 is provided with clutch teeth 44, identical to the clutch teeth 38. A power take-off shaft 45 is rotatably mounted in the lower part of the housing 32 in a position transverse to the shaft 20 and a spiral gear 46 is secured to the shaft 45 in position in mesh with the gear 42.

From the foregoing, it will be seen that when the shaft 20 is being rotated, the collar 41 may be shifted outwardly to thereby connect the shaft 33 and pulley 36 with the shaft 20 to transmit the power directly from engine to the pulley 36 without traversing any intermediate gearing. However, when it is desired to drive the shaft 45, the collar 41 is shifted inwardly, thereby disconnecting the pulley 36 and connecting the gear 42 with the shaft 20. The gear 42 in turn drives the shaft 45 through the gear 46. This is not objectionable as the power take-off shaft is used only to drive very light equipment such as mowers and the like. The pulley 36, however, is used for driving threshers and other equipment so that it is very desirable in this case that the power be conducted directly from the engine to the pulley without going through gearing of any sort.

The transmission associated with the device will now be described. This transmission consists of a driven sleeve 47, the outer end of which is rotatably mounted upon suitable roller bearings in the hub 29. The inner end of the sleeve 47 is rotatably mounted upon another bearing in the hub portion of the spider 23. The outer end of the sleeve 47 is formed integrally with an internal gear 48 and that portion of the shaft 20 in the plane of the gear 48 is provided with splines 49 by means of which a driving pinion 50 is secured thereto. The inner end of a spider 51 is rotatably mounted upon the splines 49 by means of a ball bearing assembly 52. The spider 51 has six planet pins 53 extending outwardly therefrom, which pins are secured in a disc 54, said disc having a cylindrical brake drum 55 formed around its periphery and having a hub 56 formed thereon. The hub 56 rotatably supports a sleeve 57, which sleeve has a sun gear 58 formed on its inner end concentric with the shaft 20 and pinion 50.

The hub 56 is provided with clutch teeth 59 and stationary clutch teeth 60 are formed in a flange which is fixed to the housing 32. A clutch sleeve 61 is splined to the sleeve 57 between the teeth 59 and 60. A shiftable collar 62 is slidably splined upon the sleeve 61 to selectively connect the sleeve 57 with either the stationary teeth 60 or the clutch teeth 59 on the spider 51.

Referring to Figure 5, it will be noted that each alternate pin 53 is provided with a planet pinion 63 rotatably mounted thereon, which pinions mesh with both the driving pinion 50 and the internal gear 48. It will also be noted that the remaining pins 53 each has a cluster gear rotatably mounted thereon, each of which cluster gears comprise pinions 64 and 65. The pinions 64 are smaller in diameter than the planet pinions 63 so that they do not mesh with either the pinion 50 or internal gear 48. However, these pinions do mesh with the pinions 63, as shown in Figure 5. The pinions 65 are in constant mesh with the sun gear 58 and are considerably larger in diameter than the pinions 64.

Assuming that the internal gear 48 is held stationary while the pinion 50 is rotated at engine speed, then the planet spider 51 will be rotated in the direction of motor rotation at substantially one quarter engine speed. It will also be noted that the pinions 64 will be rotated around their individual axes in the same direction as the engine rotates and will, of course, cause the pinions 65 to likewise rotate. The pinions 65 being in mesh with the sun gear 58 and being considerably larger in diameter than the pinions 64, the sun gear 58 is thus caused to rotate in a reverse direction at about 85% of engine speed.

When the clutch 62 is shifted outwardly so as to hold the sleeve 57 stationary, then the sun gear 58 is held stationary and will cause the spider 51 to rotate around the sun gear's axis at an accelerated speed of about 58% engine speed. This, in turn, will cause the internal gear 48 to be rotated in a forward direction but at a slower speed, its rotation being 46% engine speed. Thus, to effect the first forward speed of the transmission, the collar 62 is shifted outwardly.

A second speed or direct drive is provided. When this direct drive speed is to be made, the collar 62 is shifted forwardly to clutch the sun gear 58 with the disc 54 through the clutch teeth 59, thereby locking the sun gear to the pins 53. Thus the planet pinions 64 and 65 are held from rotation around their axes. The pinion 50 transmits the drive through the pinions 63 to the internal gear 48 without permitting relative rotation between the gears.

When it is desired to effect a reverse speed, the drum 55 is held from rotation by means of a brake band 66, the collar 62 being in a neutral position at this time, so that the pinions 63 simply transmit the torque from the center pinion 50 to the ring gear 48 to drive same in a reverse direction at a little less than one-third engine speed. The pinions 64 and 65 and sun gear 58 rotate but transmit no torque and are under no load at this time.

The driven sleeve 47 transmits the drive from the gear 48 to the intermediate portion of the sleeve where a driving sun gear 67 is machined thereon. A final drive sun gear 68 is rotatably mounted upon the inner end of the sleeve 47, the outer end of the gear 68 being splined to fit the hub of a spider member 69. The spider 69 is provided with three planet pins 70 and planet gears 71 are rotatably mounted upon these pins. The planet gears 71 are in mesh with the driving gear 67 and also in mesh with the internal ring gear 26. The ring gear 26, as has been mentioned, is at all times stationary so that the spider 69 and gear 68 are rotated in the direction of the sleeve 47 at a relatively low rate of speed.

Each of the pins 25 has a driving pinion 72 rotatably mounted thereon, these driving pinions being in mesh with the gear 68. A final drive ring gear 73 is in mesh with these pinions. The ring gear 73 is formed integrally with a cylindrical housing 91, the inner end of this housing being of reduced diameter and rotatably mounted upon the hub portion of the spider 23 by means of a tapered roller bearing 74. A flange 75 is bolted to the outer edge of the housing 73 and extends inwardly where it is rotatably supported upon the hub member 29 by means of a second tapered roller bearing 76. A wheel hub 77 is adapted to be bolted to the housing 73 by means of studs 78, and spokes 79 extend from the hub 77 outwardly to the rim of the wheel 22.

In the normal operation of the tractor the gear 67 rotates at engine speed and in the same direction. The spider 69 and gear 68 rotate at a relatively low speed in the direction of rotation of the engine. However, the spider 23, being held stationary at all times, causes the internal gear 73 and wheel 22 to rotate at a still further reduced speed but in a reverse direction. Consequently, in the normal operation of the tractor the engine rotates in the opposite direction to the driving wheel.

Figure 2:
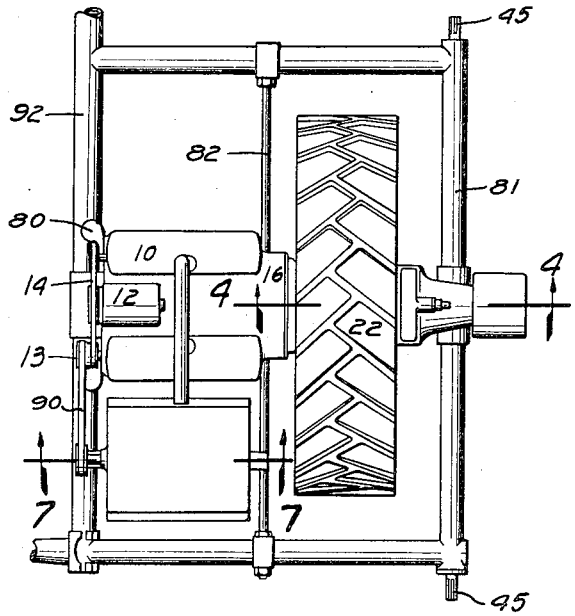
Figure 2 is a plan view of the structure shown in Figure 1.
Figure 1:
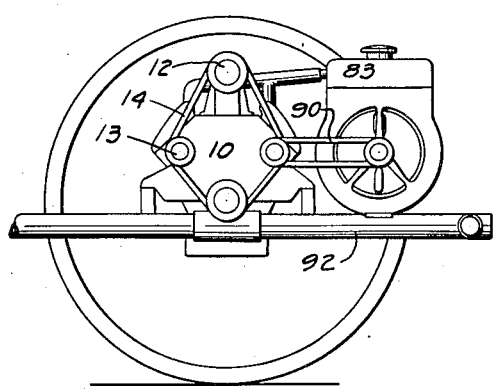
Figure 1 is a side view of my improved power unit, installed in position in a tractor frame.

Referring to Figures 1 and 2, it will be noted that my driving unit is adapted to be secured in a rectangular shaped frame 92. The outer end of the motor 10 is provided with brackets 80 which are secured to one of the frame side members. The other side member 81 of the frame is adapted to be secured by means of suitable flanges to the respective sides of the conical housing 32 in substantial axial alignment with the power take-off shaft 45. The shaft 45 extends through the tubular side members and projects from each end of the side members. In order that the draw bar pull exerted by the tractor will not cause excessive bending strain at the center of the drive unit, a pair of tension rods 82 extend from the forward and rearward frame cross members to the flywheel housing 16 to which they are secured.

As shown in Figure 7 a novel radiator construction for the motor is employed. The radiator is formed as a hollow cylinder having an annular tank 84 at each end thereof with connecting tubes 85 extending longitudinally from one tank to the other. A plurality of annular ring shaped fins 86 are provided around the tubes. Water is conducted from the cylinder heads of the motor 10 to a reservoir 83 from which it flows to the right hand tank 84. It then flows lengthwise through tubes 85 to the other tank 84, and is then conducted back to the motor. A shaft 87 is rotatably mounted upon suitable bearings within the cylindrical radiator, this shaft having a double conical shaped deflector 88 secured to its center portion and fans 89 secured to the respective ends thereof. The fans are provided with opposite pitch so that for normal rotation of the motor air will be drawn in through each end of the radiator and deflected outwardly through the fins 86 by means of the deflector 88. A belt 90 is arranged to drive the shaft 87 from a pulley secured to one water pump 13.

Among the many advantages arising from the use of my improved unit, it may be well to mention that the driving torque of the motor is delivered to the driving wheel at all speeds and gear ratios only through planetary gearing. This type of gearing is much more efficient than the conventional bevel gearing or worm gearing which have heretofore been used in nearly all tractors. Consequently, less wear of the gearing and more efficient operation is obtained thereby.

Still further, the accessory drive pulley of this unit is driven directly by the engine without the use of any gearing so that very efficient operation of the motor in driving accessories results.

Still a further advantage results in that the weight of the transmission and driving pulley tends to counterbalance the weight of the motor to thereby add stability to a tractor having this power unit incorporated therein.

Some changes may be made in the arrangement, construction and combination of the various parts of my improved device without departing from the spirit of my invention and it is my intention to cover by my claims such changes as may reasonably be included within the scope thereof.

I claim as my invention:

1. A device of the character described comprising, a stationary reduction gearing supporting member, reduction gearing mounted upon said supporting member, a housing rotatably mounted upon said supporting member enclosing said reduction gearing, said housing being driven at a reduced speed by said gearing, an internal-combustion engine assembly fixed to one end of said supporting member, a transmission fixed to the other end of said supporting member, a drive shaft extending axially through said supporting member from said engine to said transmission by means of which the torque developed by said engine is transmitted to said transmission, and a driving sleeve extending from said transmission back around said drive shaft to said reduction gearing whereby the drive from said transmission is conducted to said reduction gearing, and a driving wheel secured to said housing substantially in the plane thereof.

2. A device of the character described comprising, a stationary reduction gearing supporting member, reduction gearing mounted upon said supporting member, a housing rotatably mounted upon said supporting member enclosing said reduction gearing, said hub having an internal gear formed therein which meshes with said reduction gearing so as to be rotated thereby at a reduced speed, an internal combustion engine assembly fixed to one end of said supporting member in axial alignment with said gearing, a transmission fixed to the other end of said supporting member in axial alignment with said gearing, a drive shaft extending axially through said supporting member which transmits the torque of said engine to said transmission, a driving sleeve extending from said transmission back around said drive shaft to said reduction gearing, and a driving wheel secured to said hub.

3. A device of the character described comprising, a reduction gearing supporting member, reduction gearing rotatably mounted upon said member, a housing rotatably mounted upon said member forming an enclosure for said gearing, said housing being driven at a reduced speed by said gearing, an internal-combustion engine assembly fixed to one end of said member, a transmission fixed to the other end of said member, a drive shaft extending axially through said member from said engine to said transmission, and a sleeve extending from said transmission back around said drive shaft to said reduction gearing, said shaft transmitting the drive from said engine to the transmission and said sleeve transmitting the drive from said transmission to said reduction gearing, and a driven wheel secured to said housing.

4. A device, as claimed in claim 3, wherein said supporting member comprises in part a spider, and wherein said reduction gearing comprises in part pinions which are rotatably mounted upon said spider.

5. A device, as claimed in claim 3, wherein a pulley is rotatably mounted upon said transmission, and wherein said drive shaft extends through said transmission, and wherein a clutch is provided for operatively driving said pulley from said drive shaft.

6. A device, as claimed in claim 3, wherein both a pulley and power take-off shaft are rotatably mounted upon said transmission, and wherein said drive shaft extends through said transmission to position adjacent to said power take-off and pulley, and wherein a clutch is provided on said drive shaft which may operatively engage either said power take-off shaft or said pulley, for the purpose described.

HENRY FORD.